Nov. 27, 1962     J. J. GLAUBER     3,066,246

AUTOMATIC RESET PHOTO-ELECTRIC CONTROL DEVICE

Filed Dec. 24, 1959

INVENTOR.
JOHN J. GLAUBER
BY Richards & Geier
ATTORNEYS

United States Patent Office 3,066,246
Patented Nov. 27, 1962

3,066,246
AUTOMATIC RESET PHOTO-ELECTRIC
CONTROL DEVICE
John J. Glauber, Basking Ridge, N.J.
Filed Dec. 24, 1959, Ser. No. 861,981
3 Claims. (Cl. 317—157)

This invention relates to an automatic reset photo-electric control device, and refers more particularly to a device for automatically controlling a second electric circuit (such as an electric lamp) upon the happening of designated events, and which will automatically reset itself upon the occurrence of a designated event.

Photo-electric cells and their use in various devices are well known in prior art. However, these prior art devices do not comprise a simple automatic reset photo-electric control device which will not only control a second circuit, but which also will reset itself in readiness for the occurrence of subsequent events in the cycle of actuating events after the control has been manually vetoed.

An object of the present invention is to provide an automatic reset photo-electric control device which will cyclically and automatically open and close a second electric circuit during the various periods of the cycle of events, and which will automatically reset itself at the beginning of one period of the cycle so as to be ready to operate when the succeeding period in the cycle occurs.

Another object is to provide an automatic reset photo-electric control device which will automatically close a second electric circuit during periods of darkness and will open the second electric circuit during periods of light, and which will automatically reset itself when the light period occurs so that the second circuit may be reclosed when a period of darkness reoccurs.

Another object is to provide an automatic reset photo-electric control device wherein the control of the photo-electric device over a second electric circuit may be manually vetoed during periods of darkness without interfering with the photo-electric circuit, but which will automatically reset itself at the beginning of the next light period so that it will be ready to automatically close the second circuit at the beginning of the subsequent period of darkness.

Another object is to provide an automatic reset photo-electric control device wherein no power is consumed when the photo-electric circuit is non-conductive.

Another object is to provide an automatic reset photo-electric control device with a reset plunger or contact control member which is illuminated during periods of darkness by a cold cathode glow tube or the like.

Another object is to provide an automatic reset photo-electric control device having fewer component parts than similar devices.

Another object is to provide an automatic reset photo-electric control device having separable units comprising a plug portion, a photo-cell portion, and a circuit portion.

A further object is to provide an automatic reset photo-electric control device which will be easy and inexpensive to manufacture.

Other objects of the present invention will become apparent in the course of the following specification.

The objects of the present invention may be realized through the provision of a photo-electric circuit comprising a photo-electric cell, a glow tube, a solenoid, and the necessary capacitors and resistances, arranged so that when the photo-electric cell is exposed to cyclic periods of light and darkness, electrical contacts in a second electric circuit will open or close. At the end of any period of the cycle the device will automatically reset itself so that at the beginning of the succeeding period it will be ready to operate as required during that subsequent period.

Even where the reset device is manually operated to veto the control of the photo-electric circuit over the second circuit, the reset device will automatically reset itself so as to be ready to properly operate at the beginning of the subsequent period of the cycle.

The invention will appear more clearly from the following detailed description when taken in connection with the accompanying drawing showing, by way of example, preferred embodiments of the inventive idea.

Figure 1:
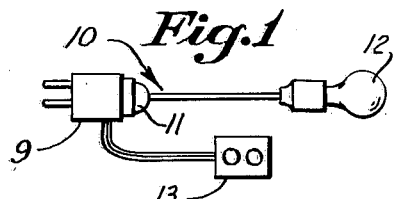
FIGURE 1 shows one embodiment of the present invention.

The automatic reset photo-electric control device 10 of the present invention is shown in one embodiment in FIGURE 1 and comprises a combination male-female plug 9, a standard male plug 11, a bulb 12, and a photo-electric device 13.

Figure 5:
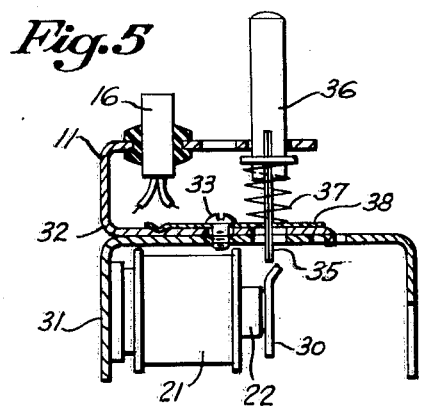
FIGURE 5 is a partial cross-sectional view of electrical and mechanical members comprising the present invention, showing the electrical contacts closed.
Figure 2:
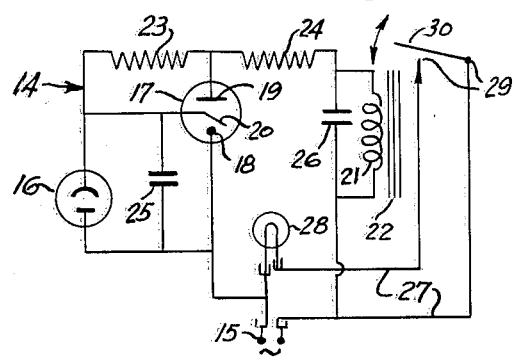
FIGURE 2 is a diagram of an electric circuit of the present invention.
Figure 3:
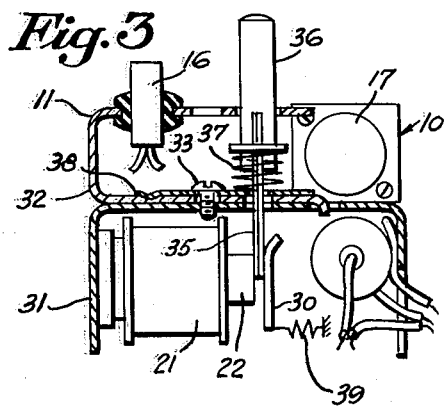
FIGURE 3 is a partial cross-sectional view of electrical and mechanical members comprising the present invention, showing the electrical contacts open.

Shown in FIGURE 2 is a diagram of a photo-electric circuit 14 of the present invention, which comprises an electrical connection 15 for connection to a source of electrical power, a photo-electric cell 16, a rectifying means such as a cold cathode glow discharge tube or triode 17 which comprises a cathode 18, an anode 19 and a starter electrode 20; a solenoid 21 and magnetic core portion 22, and resistors 23 and 24 and capacitors 25, 26; and a second electrical circuit 27 comprising electrical devices such as a lamp 28, and electrical contacts 29; and an electrically conductive magnetic armature 30 connected to one of said contacts 29 and disposed adjacent to core portion 22 and another contact 29. A partial cross-sectional view of the automatic reset photo-electric control device 10, showing electrical and mechanical parts utilized therein, is shown in FIGURES 3 and 5. FIGURE 3 shows the relationship of the various parts resulting in the second circuit 27 being open, while FIGURE 5 shows the relationship of the parts when the second circuit 27 is closed. Among the parts shown in FIGURES 3 and 5 are a chassis portion 31 and a bracket portion 32 connected together by means of screw 33. Core portion 22 is shown with solenoid 21, and a thin movable magnetic contact control member 35 with a transparent plunger portion 36 is biased by a spring 37 in a position remote from core portion 22 (FIGURE 5). The photo-electric cell 16 and triode 17 are also shown as well as a guide strip 38 whose purpose is to prevent contact control member 35 from becoming misaligned as will be explained below. The photo-electric circuit 14 is not shown in its entirety in FIGURES 3 to 6, inclusive, for the sake of simplicity.

Figure 6:
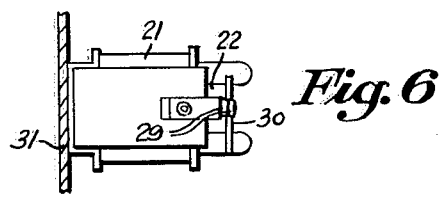
FIGURE 6 shows the electrical contacts closed.
Figure 4:
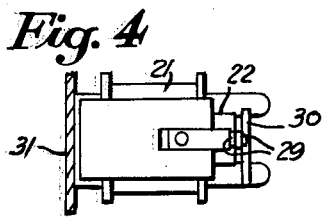
FIGURE 4 shows the electrical contacts open.

The manner of operation and use of the automatic reset photo-electric control device 10 of the present invention is as follows:

The electrical connection 15 is connected to a source of alternating current, preferably 120 volts. The photo-electric cell 16 when exposed to light becomes conductive, and, therefore, starter electrode 20 of the cold cathode glow discharge triode 17 becomes electrically connected to the cathode 18, and the triode 17 is, therefore, non-conductive. During the periods in which the triode 17 is non-conductive there is obviously no current flowing through the solenoid 21, no magnetic field exists, and the the core portion 22 will, therefore, not attract the armature 30. While the armature 30 is disposed adjacent to the core 22, it is biased away from the core 22 by inelastic means such as spring 39. When current flows in the solenoid 21, a magnetic field is produced causing the core 22 to become magnetic and the armature 30 is attracted to the core 22. Since one of the contacts 29 moves with the armature 30, the contacts 29 will close second circuit 27 when the armature 30 is attracted to the core 22. FIGURES 3 and 4 show the position of armature 30 with respect to core 22 when no current is flowing in the solenoid 21. FIGURES 5 and 6 show the armature 30 in contact with core 22, and the contacts 29 in electrical connection with one another, when current flows in the solenoid 21.

When darkness occurs the photo-electric cell 16 becomes non-conductive and the starter electrode 20 through resistance 23, assumes a more positive potential when the anode 19 is positive. Since the starter electrode 20 and anode 19 are in phase, whenever the anode 19 is positive the starter electrode 20 is also positive. At some time during each half cycle the starter electrode 20 is sufficiently positive to trigger ionization from the cathode 18 to the anode 19 whereby the triode 17 becomes conductive. An anode current then flows through resistor 24 and solenoid 21, and a magnetic field is produced in core 22 attracting armature 30 and thereby connecting the contacts 29 and closing the second circuit 27. During the other half cycle of alternating current the anode 19 and starter electrode 20 are negative with respect to the cathode 18, and triode 17 is non-conductive. During this half-cycle no anode current flows through the solenoid 21 and the contacts 29 would open except for the fact that capacitor 26 has sufficient capacitance to discharge only a part of its stored energy before the anode 19 again becomes positive and the capacitor 26 recharges. Thus the solenoid 21 has a direct current component through it whenever the triode 17 is operative. The capacitor 25 is employed to properly phase the voltage applied to the grid plate 20 to enhance conduction. When a period of light again impinges on the photo-electric cell 16, it becomes conductive, the triode 17 becomes non-conductive, current ceases to flow in solenoid 21, the magnetic field collapses, and spring 39 moves armature 30 away from core 22 opening contacts 29, whereby the second circuit 27 is opened. When darkness again occurs, the photo-electric cell 16 becomes non-conductive, the triode 17 becomes conductive, current flows through solenoid 21, a magnetic field is created, armature 30 is attracted to core 22 closing contacts 29, whereby the second circuit 27 is closed. As the cycles of light and darkness succeed one another the device 10 of the present invention automatically opens and closes second circuit 27 and is automatically reset to respond to each subsequent change in the cycle without any manual control.

During the operations described above the plunger 36 and contact control member 35 are in the inoperative position shown in FIGURE 5, and do not in any way interfere with the operation of the photo-electric circuit 14, the second circuit 27, or the armature 30. The plunger 36 and contact control member 35 are held in the inoperative position by spring 37. During periods of darkness if it is desired to veto the control of the photo-electric circuit 14 over second circuit 27 and to open the circuit 27, the contact control member 35 may be manually depressed from the inoperative position shown in FIGURE 5 to the operative position shown in FIGURE 3. When the contact control member 35 is moved to the operative position, it forces armature 30 into the position normally maintained by armature 30 during periods in which light is impinging upon the photo-electric cell 16. The movement of the armature 30 opens the contacts 29 and opens circuit 27. The contact control member 35 and plunger 36 will remain in the depressed operative position during the hours of darkness, even against the upward force of spring 37, because the photo-electric cell 16 will continue to be non-conductive, triode 17 will continue to be conductive, and current will continue to flow in solenoid 21, whereby the resulting magnetic field will hold the magnetic contact control member 35 against core 22. During the hours of darkness the contact control member 35 may be manually returned to the inoperative position wherein it will be held by spring 37, and the magnetic field will again attract armature 30 to core 22 closing second circuit 27, and the device 10 will thereafter continue to operate in its normal manner.

However, if the contact control member 35 is not manually returned to the inoperative position during this period of darkness, the device 10 will automatically reset itself, so that the circuit 27 will be open during the subsequent period of light and will automatically close again at the beginning of the next subsequent period of darkness. This automatic resetting is accomplished in the following manner: As light impinges upon photo-electric cell 16 it becomes conductive, triode 17 becomes non-conductive, current no longer flows in solenoid 21, the magnetic field collapses, and spring 37 returns contact control member 35 and plunger 36 to their inoperative position. Armature 30 remains in its open position ready to close second circuit 27 whenever darkness falls again on photo-electric cell 16. Thus, even though the device 10 during the one period of darkness is manually caused to open second circuit 27, the device 10 will automatically operate normally in all subsequent periods of light and darkness without any further manual interference. It should be noted that the photo-electric circuit 14 is never interfered with by the operation of contact control member 35.

Guide strip 38 contains a slot through which contact control member 35 freely passes, and is used to locate contact control member 35 so that it may properly engage armature 30. This is necessary in order to allow parts of device 10 to accommodate themselves to various solenoids and cores.

The triode 17 is a cold cathode glow discharge triode, so that the plunger 36, which is made of transparent plastic, will be illuminated during periods of darkness and may be readily located when it is depressed.

Figure 7:
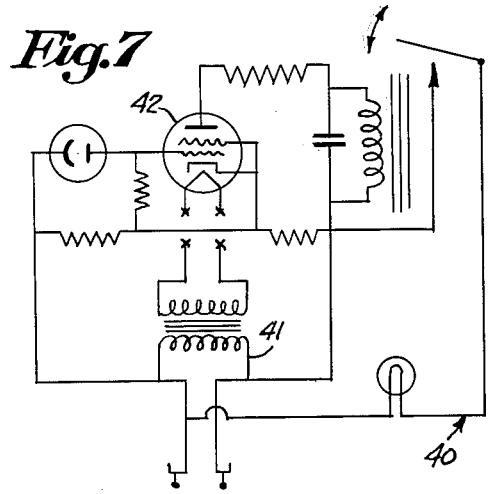
FIGURE 7 is a diagram showing another electrical circuit of the present invention.

A diagram of an electric circuit of another embodiment 40 of the present invention is shown in FIGURE 7, and is the same as the embodiment of FIGURE 2 except that a transformer 41 and pentode 42 are placed in the circuit 40. The advantages of the circuit of FIG. 2 over the circuit of FIG. 7 include the following: During daylight, when inoperative, no power is consumed by the embodiment of FIG. 2; a cold cathode glow discharge tube is employed in FIG. 2 and when operating during darkness, the tube glows and in conjunction with a transparent plunger makes the latter visible, thus facilitating locating the plunger if it is desired to move it from the operative to inoperative position; and the embodiment of FIG. 2 uses fewer component parts.

Figure 8:
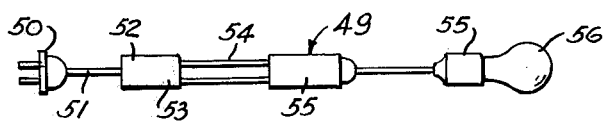
FIGURE 8 shows another embodiment of the present invention wherein the various components may be disposed at separate locations.

The various portions of the present invention may be separated and located some distance apart as is indicated by embodiment 49 shown in FIG. 8, comprising a connection 50 connected by wires 51 to a photo-electric cell 52 and triode 53, which in turn are connected by wires 54 to a solenoid 55 and lamp 56. Thus the photo-electric cell 52 and triode 53 may be in one unit at a window sill with the solenoid 55, lamp 56, and connection 50 located elsewhere in the room.

Among the advantages of the automatic reset photoelectric device of the present invention are the following: The device will automatically respond to successive periods of light and darkness so as to automatically open and close an electric circuit and will automatically reset itself during any period of the cycle so as to be ready to operate the electric circuit at the beginning of the subsequent period of the cycle; the device can be manually operated so as to veto the commands of the photo-electric cell; even when manually operated the device will automatically reset itself at the end of the period in preparation for the subsequent periods of the cycle; no power is consumed by the device when the electric circuit is open; during periods of darkness the reset plunger is illuminated; the device requires fewer component parts than similar devices; the device is separable into various components which may be located at widely separated points; and the device of the present invention is easy and inexpensive to manufacture.

It is apparent that the described examples are capable of many variations and modifications within the scope of the present invention. All such variations and modifications are to be included within the scope of the present invention.

What is claimed is:

1. In a photo-electric control circuit, an automatic reset device comprising in combination with a solenoid having a magnetic core portion and adapted to be energized and de-energized during consecutive time periods, a magnetic armature attracted to said core portion when said solenoid is energized, means connected with said armature for maintaining said armature in an inoperative position spaced from said core portion when said solenoid is de-energized, and contacts closed by said armature in said attracted position and opened when said armature is in the inoperative position; a magnetic contact control member, a plunger connected with said control member for moving said control member from an inoperative position wherein said control member is remote from said core portion and said armature to an operative position wherein said control member is attracted by said core portion and engages said armature to maintain said armature in its inoperative position, and a spring engaging said plunger for moving said plunger and said control member from the last-mentioned operative position to the last-mentioned inoperative position when said solenoid is de-energized.

2. An automatic reset device for use in a photo-electric control circuit in accordance with claim 1, wherein said plunger has a transparent portion, whereby said plunger can be illuminated when electricity flows in said control circuit.

3. In a photo-electric control circuit, an automatic reset device comprising in combination with a solenoid having a magnetic core portion and adapted to be energized and de-energized during consecutive time periods, a magnetic armature attracted to said core portion when said solenoid is energized, means connected with said armature for maintaining said armature in an inoperative position spaced from said core portion when said solenoid is de-energized, and contacts closed by said armature in said attracted position and opened when said solenoid is de-energized; a magnetic contact control member having a normally inoperative position wherein it is remote from said core portion and said armature, manually operable means for selectively moving said control member into an operative position biasing said armature away from said core portion when said solenoid is energized, said contact member being attracted by said core portion, and means automatically returning said contact member to an inoperative position when said solenoid is de-energized.

References Cited in the file of this patent

UNITED STATES PATENTS

| 2,295,894 | Dewan | Sept. 15, 1942 |
| 2,810,902 | Crossley | Oct. 22, 1957 |
| 2,838,716 | Spierer | June 10, 1958 |

FOREIGN PATENTS

| 739,915 | Great Britain | Nov. 2, 1955 |

OTHER REFERENCES

White: "Radio Electronics," pages 34–36, April 1950.